E. R. KNIGHT.
INDUCTION MOTOR.
APPLICATION FILED APR. 30, 1909.
995,469.
Patented June 20, 1911.
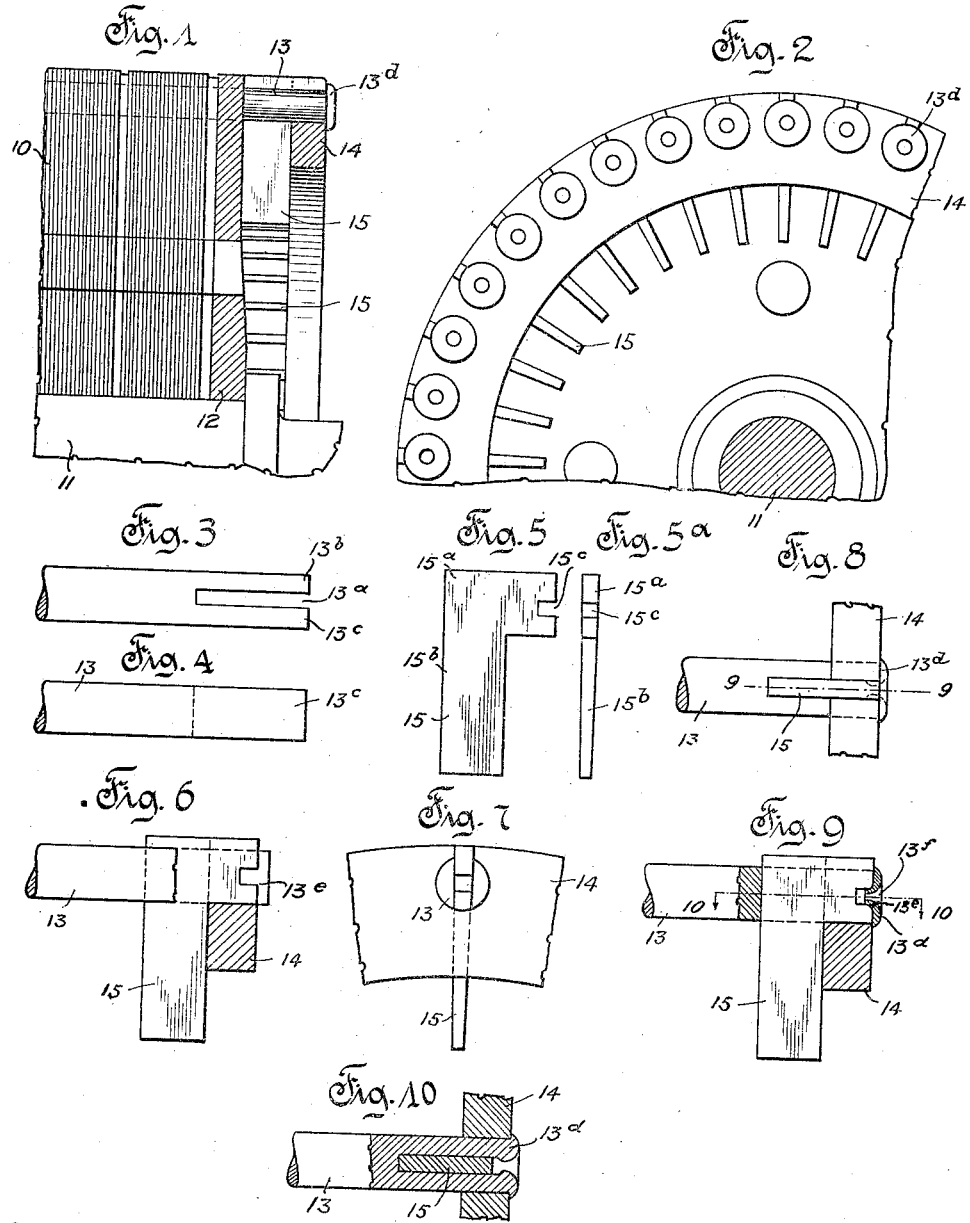

UNITED STATES PATENT OFFICE.

EARLE R. KNIGHT, OF NORWOOD, OHIO, ASSIGNOR TO ALLIS-CHALMERS COMPANY, A CORPORATION OF NEW JERSEY.

INDUCTION-MOTOR.

995,469.  Specification of Letters Patent.  Patented June 20, 1911.

Application filed April 30, 1909. Serial No. 493,134.

*To all whom it may concern:*

Be it known that I, EARLE R. KNIGHT, a citizen of the United States, residing at Norwood, in the county of Hamilton and State of Ohio, have invented certain new and useful Improvements in Induction-Motors, of which the following is a full, clear, and exact specification.

This invention relates to induction motors, and particularly to the means for securing together the conductor bars and short-circuiting rings of squirrel cage rotors.

In another aspect the invention relates to the method which is carried out in forming the connections.

One of the objects of the invention is to provide means and a method for securing together the bars and the rings of a squirrel cage rotor so as to form joints or connections which are extremely effective mechanically and electrically, and which are very simple in construction.

A further object is to provide connecting means embodying certain members which act as fan blades to create a sufficient circulation of air when the machine is in operation to effectively cool the stator.

In the accompanying sheet of drawings, Figure 1 is a partial sectional view of one end of a squirrel cage rotor having the bars and the rings secured together in accordance with my invention. Fig. 2 is a partial end view of the rotor, the shaft being shown in section; Fig. 3 is a view of one end of one of the bars; Fig. 4 is a similar view with the bar turned 90°; Fig. 5 is a side view of one of the keys or wedges which are utilized in securing the bars and rings together; Fig. 5ª is a front view of the key illustrated in Fig. 5; Fig. 6 is a detailed sectional elevation with parts broken away and showing a portion of one of the bars, a wedge or key, and one of the rings, this view showing the parts before the end of the bar is upset or enlarged; Fig. 7 is a similar view looking toward the end of the machine; Fig. 8 is a top plan view of the same after the joint or connection has been completed; Fig. 9 is a section of the same taken substantially along the line 9—9 of Fig. 8; and Fig. 10 is a section of the same taken substantially along the line 10—10 of Fig. 9, looking in the direction indicated by the arrow.

Referring now to the figures of the drawing, 10 represents the laminated core of a squirrel cage rotor, of an induction motor, said core being mounted upon a shaft 11 and the laminæ being clamped between the usual end-heads, one of which is shown at 12. The core is provided at or near the periphery with slots in which are located conductor bars 13, which project outwardly a suitable distance beyond the clamping plates 12, the bars being in this instance circular in cross section. As is shown clearly in the drawings and particularly in Figs. 3 and 4, the bars are provided with open slots 13ª which extend inwardly from the ends, forming in the end of each conductor, a fork or two arms or end portions 13ᵇ and 13ᶜ.

At 14 is shown a short-circuiting ring, which, in this case, is spaced a short distance from the end plate 12, and this ring is provided with openings or partially closed slots which are in alinement with the slots of the core and receive the ends of the bars 13. While I have shown only one end of the rotor, it will be understood that the construction at both ends of the rotor is the same. The slotted ends of the bars are spread or forced tightly against the walls of the slots of the rings by keys or wedges 15, each of which as is shown clearly in Figs. 5 and 5ª is L-shaped, being provided with two arms 15ª and 15ᵇ which are arranged at substantially right angles to each other. The arm 15ª of each key is in this case shorter than the arm 15ᵇ and has at its free end an open notch 15ᶜ, the purpose of which will be explained, and each key is tapered toward the free end of the longer arm 15ᵇ as is shown clearly in Fig. 5ª. When the keys or wedges are inserted, they are driven tightly into the slots 13ª of the bars, forcing the ends of the latter firmly into engagement with the rings, and when the keys are driven in place, the outer portions are substantially flush with the outer peripheries of the rings and core, it being understood that the opening at the outer portion of each slot of the ring is of sufficient width to receive the corresponding key or wedge and to permit it to be driven into place. When the keys or wedges are in place they occupy the positions shown in the drawings, that is, the longer arms 15ᵇ are located between the rings and the end plates 12 of the core, so as to space the rings from the latter, and preferably extend radially inward beyond the rings so as to form very effective fan blades. The ends of the shorter arms are preferably flush with the outer surfaces of the rings, and before the ends of the bars are upset in a manner to be described presently the latter project beyond the rings and ends of the keys.

To hold the bars and keys in place, the outwardly projecting ends of the bars or the slotted portions which project beyond the outer surfaces of the rings are upset with a suitable tool, forming enlarged circular heads 13$^d$, and part of the metal, shown at 13$^e$, is forced into the notches 15$^e$ of the keys. The ends of the conductors are shaped in this manner preferably by spinning operations, a spinning tool of the proper shape being employed. When the ends of the bars are spun, the metal of the two parts of each bar is united, bridging the slot between the parts and forming a continuous circular head quite similar to that formed by an ordinary upsetting tool such as a riveter, with the exception that in spinning the metal into the notch a tapered depression 13$^f$ is formed in the head.

It will be seen that the construction which I have described above is extremely simple, and that excellent electrical and mechanical connections are obtained for the reason that the keys drive the ends of the bars very tightly against the walls of the slots in the rings, thereby providing contact surfaces of considerable area, and for the reason that by upsetting the ends of the bars and by spreading the metal into the notches of the keys, accidental displacement or even loosening of the parts is absolutely prevented. Furthermore, the inwardly projecting ends of the keys or wedges serve as fan blades to force an ample volume of air outward to cool the stator and parts of the rotor.

I do not desire to be confined to the exact details shown, but aim in my claims to cover all modifications which do not involve a departure from the spirit and scope of my invention.

What I claim as new and desire to secure by Letters Patent is:

1. In a rotor of an induction motor, a core, conductors carried by the core and provided with slotted ends, a short-circuiting ring having openings receiving the ends of the conductors, and spreading members inserted in the slotted ends of the conductors, said conductors and spreading members having interlocking portions which prevent relative displacement of said parts, the locking portions of said conductors comprising upset ends thereof.

2. In a rotor of an induction motor, a core, conductor bars carried by the core and provided with slotted ends, a short-circuiting ring having openings receiving the ends of the conductors, and notched spreading members inserted in the slotted portions of the conductors, portions of the metal of the conductors being forced into the notches of the spreading members to prevent displacement of said members.

3. In a rotor of an induction motor, a core, conductor bars carried by the core and provided with slotted ends, a short-circuiting ring having openings receiving the ends of the bars, and tapered keys inserted radially in the slotted portions of the conductors, said keys having notches into which the metal of the conductors is spread to prevent displacement of said members.

4. In a rotor of an induction motor, a core, conductor bars carried by the core and provided with slotted ends, a short-circuiting ring having openings receiving the ends of the bars, and substantially L-shaped spreading members inserted in the slotted ends of the conductors, said members having axially extending portions which are notched or recessed, and portions extending radially between the rings and core, the metal of the bars being spread into the notches to prevent displacement of said members.

5. In a rotor of an induction motor, a core having conductor bars provided with slotted ends, a short-circuiting ring having openings which receive the ends of the bars, and substantially radially arranged spreading members inserted in the slotted ends of the bars and extending inwardly beyond the latter so as to act as fan blades.

6. In the rotor of an induction motor, a core having conductor bars provided with slotted ends, a short-circuiting ring having openings which receive the ends of the bars, and substantially radially arranged spreading members inserted in the slotted ends of the conductors and extending inwardly beyond the latter so as to act as fan blades, said conductors shaped to prevent displacement of said members.

7. In a rotor of an induction motor, a core having conductor bars provided with slotted ends, a short-circuiting ring having openings which receive the bars, and substantially L-shaped members driven into the slots of the conductors, said members having radial portions which extend inward between the core and ring and act as fan blades, and axial portions which extend toward the ends of the bars, said axial portions having notches and the ends of the bars being upset and forced into said notches.

8. In the rotor of an induction motor, a core, slotted conductors carried thereby, short-circuiting rings having openings into which said conductors extend, and fans extending through said conductors wedging together said conductors and rings.

9. In the rotor of an induction motor, a core, slotted conductors carried thereby, short-circuiting rings having openings into which said conductors extend, and fans having spreading portions extending through said conductors wedging together said conductors and rings.

Milwaukee, Wis., April 9, 1909.

In testimony whereof I affix my signature, in the presence of two witnesses.

EARLE R. KNIGHT.

Witnesses:
GEORGE EVANS,
JOHN W. HOPPER.